Oct. 18, 1966   R. D. RUMSEY   3,279,781
HYDRAULIC BUFFER

Original Filed Dec. 8, 1961   2 Sheets-Sheet 1

INVENTOR.
Rollin Douglas Rumsey
BY
ATTORNEYS

Oct. 18, 1966 R. D. RUMSEY 3,279,781
HYDRAULIC BUFFER
Original Filed Dec. 8, 1961 2 Sheets-Sheet 2
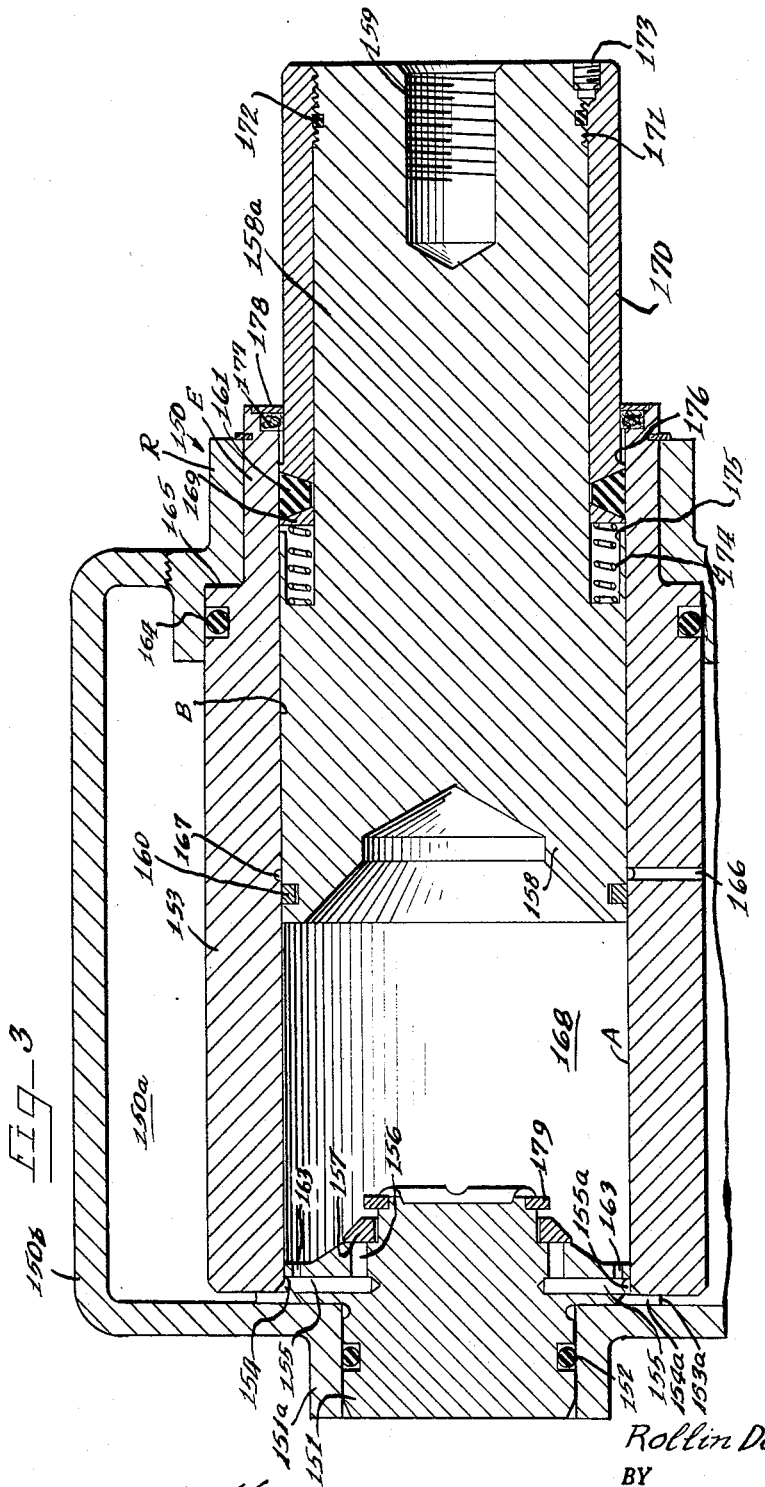
FIG_3
INVENTOR.
Rollin Douglas Rumsey
BY
ATTORNEYS

United States Patent Office 3,279,781
Patented Oct. 18, 1966

3,279,781
HYDRAULIC BUFFER
Rollin Douglas Rumsey, Buffalo, N.Y., assignor to Houdaille Industries, Inc., Buffalo, N.Y., a corporation of Michigan
Original application Dec. 8, 1961, Ser. No. 157,981, now Patent No. 3,190,630, dated June 22, 1965. Divided and this application Apr. 23, 1965, Ser. No. 463,977
19 Claims. (Cl. 267—1)

The present application is a division of application Serial No. 157,981 filed December 8, 1961, now Patent No. 3,190,630.

This invention relates to hydraulic shock absorbing buffers, and more particularly to such buffers capable of absorbing high loads under adverse environmental conditions.

In various environments and conditions of use, shock absorbing devices, especially of the heavy duty type, must survive long periods of inactivity while remaining capable of reliable and efficient operation.

During periods of inactivity, such buffers may become smothered in paint or dirt.

Extremely high capacity in proportion to size is a criterion in not only antenna buffers, as mentioned, but also in other buffers as may be used in aircraft, missiles, and the like, where weight and space are at a premium. Furthermore, it is highly desirable to afford hydraulic shock absorbers or buffers which will function reliably under conditions where maintenance is haphazard, careless or even omitted.

Accordingly, it is an important object of the present invention to provide new and improved hydraulic shock absorbing buffer structures which will effectively overcome the foregoing and other problems and meet the design objectives resulting from the difficulties indicated, and is capable of long life and high load concentrations.

Another object of the invention is to provide improvements in hydraulic buffer constructions, embodying numerous advantageous features contributing to efficiency, reliability, rugged structural relationships within minimum dimensions, and high linear load or impact damping within minimum envelope size limitations.

A further object of the invention is to provide advantageously economical buffer structures.

Other objects, features and advantages of the invention will be readily apparent from the following detailed description of certain preferred embodiments thereof, taken in conjunction with the accompanying drawings, in which:

FIGURE 3 is a longitudinal sectional view through another form of the buffer.

Figures 1, 2:
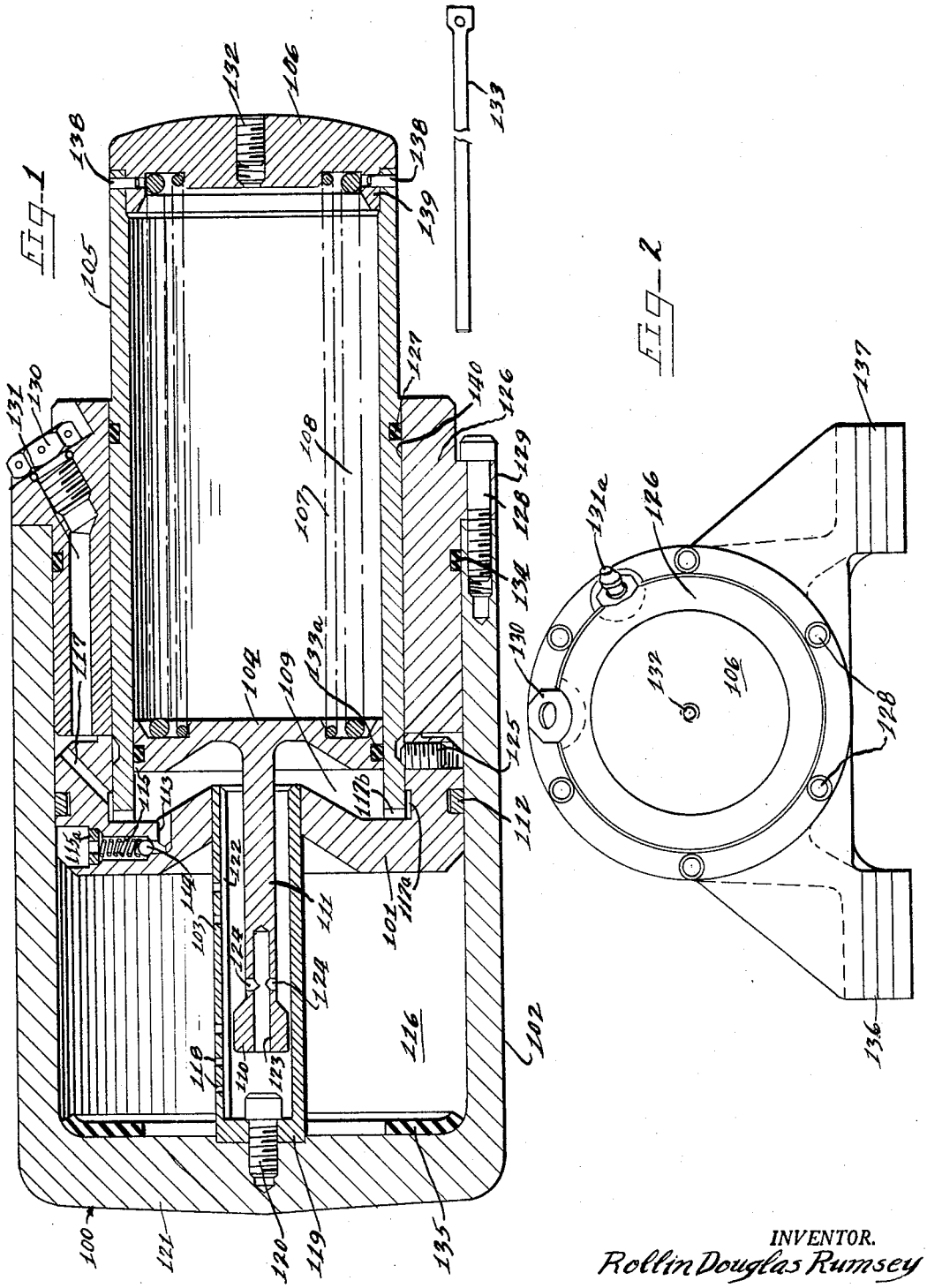
FIGURE 1 is a longitudinal sectional detail view showing one form of the buffer.
FIGURE 2 is a right end elevational view of the buffer of FIGURE 1.

On reference to FIGURES 1 and 2, a buffer 100 embodying principles of the present invention includes a piston 101, a working cylinder 102, a metering tube 103, a replenishing piston 104, a piston rod 105 of tubular cylindrical form having a preferably arcuately surfaced load-bearing outer end wall 106, return or loading springs 107 and 108 for the piston 104 and thrusting between the end wall 106 and such piston, a replenishing chamber 109 within the cylindrical interior of the rod 105 between the working piston 101 and the replenishing piston 104, and a replenishing piston stabilizer 110 integrally and coaxially connected to the piston 104 by a rod 111.

In its periphery, the working piston 101 has a piston ring 112 in sealing relation to the engaged wall of the working cylinder 102. This working cylinder, it will be observed, is exceptionally rugged in structure and without perforations through its wall.

In order to afford fluid transfer from the replenishing chamber 109 through the working piston 101 during return strokes of the working piston but to prevent or block communication from the front of the working piston to the back of the piston during inward working strokes thereof, a check valved passage 113 is provided in the working piston 101 including a rearwardly extending opening and a laterally extending branch affording a seat for a check valve such as a ball valve 114 normally biased against the seat by means such as a biasing spring 115 which at its opposite end thrusts against a perforated spring retainer abutment in an enlarged or counterbored portion of the passage opening through the periphery of the piston inwardly from the piston ring 112 and in free communication forwardly of the piston with a working chamber 116 defined by the cylinder 102. A vent hole 117 is provided in the piston 101 to avoid vacuum from developing in the area in back of the piston during closing or inward strokes of the piston.

A plurality of orifices 118 are provided through the wall of the metering tube 103 and these orifices are parabolically spaced. In this instance the metering tube comprises a blind end bore having its inner or rear end open and its forward end closed by an end wall 119 which is secured as by means of a screw 120 to the inner side of a solid integral end wall 121 on the cylinder 102. The metering tube is slidably engaged through a central bearing opening through the working piston 101 and discharges to the back of the piston into the replenishing chamber 109. On its inner longitudinal surface, the metering tube 103 has flats or longitudinal notches 122 permitting flow past the enlarged head of the replenishing piston stabilizer 110. Additional metering of fluid past the stabilizer 110 is effected through a coaxial blind bore 123 opening through the stabilizer and into the stem 111 and having lateral ports 124 opening into the area rearwardly from the stabilizer.

Attachment of the working piston 101 to the cylinder piston rod 105 may be effected, as shown, by suitable means such as set screws 125, the piston being provided with a suitably axially rearwardly extending marginal flange for this purpose. Rearward or retracted limit stop for the piston 101 is provided by a combination cylinder end closure, cylinder extension and piston rod guide and cover guard member 126. The length of the tubular member 126 is such as to completely enclose a substantial length of the piston rod 105 rearwardly from the piston 101 such that an external seal 127 on the piston rod 105 rearwardly from the piston will remain in sealing engagement with the member 126 throughout the entire range of reciprocal movements of the piston 101. Attachment of the abutment guiding and closure sleeve member 126 to the rear end of the cylinder 102 is effected by means of screws or bolts 128 extending through a radial flange 129 integral with the member 126 and abutting the cylinder end. A sealing ring 134 is desirably afforded in the joint between the cylinder 102 and the cylinder extension sleeve 126 to prevent leakage.

Filling of the damper 100 with hydraulic fluid is adapted to be effected through a suitable filler and air bleed opening in the upper rear portion of the extension sleeve 126 and in service closed by a screw plug 130 threaded therein. Extending forwardly from the opening is a passage 131 communicating with the area back of the working piston 101. During the filling operation, hydraulic fluid delivered through the passage 131 passes by way of the port 117 in the axial flange of the working piston, a clearance groove 117a in the inside wall of such flange and radial grooves 117b in the inner end of the piston rod tube into the replenishment chamber 109 and thence into the working chamber 116 through the orifices 118 in the metering tube 103, whereby to establish a filled system. For establishing suitable hydraulic pressure in the replenishment chamber 109, a pressure fill fitting 131a is also desirably provided on the extension 126, as shown in FIG. 2.

For determining desirable hydraulic fluid fill level in the buffer unit 100, an access opening, normally closed by a plug 132, is provided in the end wall closure member 106 of the tubular piston rod 105. Through such access opening, the level may be determined by a level indicator 133 which is adapted to be engaged at its end against the replenishing piston 104, thereby affording visual representation of the fill level.

Attachment of the end closure or cap 106 to the rear end of the tubular piston rod 105, is effected as by means of radially extending pins 138 pressed or therwise engaged through suitable pin holes in the rear end margin of the piston rod member and secured in an axially inwardly extending annular attachment flange 139 on the closure member. By having at least one of the attaching pins 138 in the form of a roll pin or bored or grooved, adequate breather passage may be afforded for the dead chamber space between the replenishing piston 104 and the closure 106. Leakage into the dead air chamber past the piston 104 is prevented by suitable sealing means such as an O-ring 133a mounted in the perimeter of the piston.

Forward impact of the working piston 101 against the solid end closure 121 of the working chamber 116 is cushioned by a cushioning member comprising an annular cushion stop 135 which may be secured to the inner face of the end wall 121 by adhesive or the like.

As shown in FIGURE 2, the cylinder 102 may have integrally formed thereon mounting and fastening flanges 136 and 137, through which bolts or the like may be inserted for connection with an object or part of apparatus with which the buffer 100 may be utilized, especially where the load to be damped is transmitted to the piston 101 through the end member 106 of the piston rod. On the other hand, the buffer 100 may be mounted in such a manner in relation to the associated apparatus that the load is applied to the end closure 121, or it may be applied to both ends of the unit.

In operation of the buffer 100, high pressures are adapted to be developed in the buffer chamber 116, and damping is effected by energy absorption through displacement of the hydraulic fluid through the orifices 118 of the metering tube 103 and past the stabilizer head 110 by way of the flats or grooves 122 and the passages 123 and 124. During working stroke, that is inward movement of the working piston 101, fluid is displaced into the replenishing chamber 109, thereby loading the replenishing piston 104 through compression of the springs 107 and 108. During return movement of the working piston 101, wherein relative inward pressure on the piston rod 105 is released or at least backed off, forward pressure exerted by the replenishing piston 104 under the bias of the springs 107 and 108 causes return rearward movement of the working piston 101 by reason of the effective area differential on the forward side of the piston. During such return movement, return damping is accomplished because the returning presure fluid must pass in reverse through the metering orifices and passages in and within the metering tube 103, and through the check valved passage 113 serving also as a return damping metering orifice.

Since the buffer 100 is normally extended, that is the working piston 101 normally returns to stopped position against the inner end of the sleeve extension member 126, and the piston rod 105 projects to its full limit beyond the outer end of the extension 126, that portion of the piston rod which is encompassed by the extension 126 in such extended position opposes and maintains a clean inner surface 140 on the cylinder extension 126. Outwardly beyond the encompassed portion, the piston rod 105 is, as shown, of slightly reduced diameter. As a result, the seal 127 always works over a clean surface in the operating reciprocations of the working piston and piston rod, and the surface 140 is not contaminated by the normally outwardly extending portion of the piston rod as it moves down into the cylinder extension sleeve 126 during inward or working strokes, due to the reduced diameter of such normally outer end portion of the piston rod.

In the embodiment of FIGURE 3, a buffer unit 150 is provided having a hydraulic fluid reservoir 150a defined by a housing 150b provided at one end with an end closure having an opening therethrough which is closed by a flanged plate or closure member 151 fitting within an outwardly extending annular flange 151a about the opening and having a sealing ring 152 sealing the joint between the plug-like flange member and the head flange. The member 151 may be provided for connection with means for fastening the head end of the unit to a member or apparatus with which the buffer unit is to be used.

Extending longitudinally through the reservoir 150a is a tubular working cylinder 153 of heavy wall section to withstand high pressures and having its longitudinal working area A free from any perforations. Concentric mounting of the forward end of the cylinder 153 with respect to the head member 151 is effected by telescopic reception of an inwardly projecting portion of the head member, including an annular radial flange 153a thereon abutting the inner side of the housing head closure and against which flange the associated end of the cylinder thrusts whereby to maintain the head member 151 against inward displacement.

At its opposite end, the cylinder 153 has an extension portion E which throughout a substantial terminal end portion is of externaly reduced diameter and is interengaged by an annular stepped ring flange R of the housing 150b and which desirably comprises not only a closure ring for the rear end of the reservoir 150a but also a retainer for the cylinder 153 and may be threadedly or otherwise secured to the housing. Through this arrangement, assembly of the end closure head member 151 and the cylinder 153 is adapted to be effected through the opening in the housing 150b afforded before the closure and cylinder retaining ring R is secured in place. In the fully assembled relation axially facing opposed shoulder areas 165 on the cylinder and the retaining ring afford an axially inward thrust on the cylinder, while the ring also maintains the outer end portion of the cylinder concentric with the head end closure member 151. A seal such as an O-ring 164 prevents leakage through the joint between the cylinder and the retaining ring R.

Longitudinaly reciprocable within the cylinder 153 is a working piston 158 of massive, one-piece construction having solidly in one piece therewith a piston rod 158a which is of a length to extend substantially outwardly beyond the end of the cylinder extension E throughout the range of reciprocable movement of the piston in the cylinder. At its outer end, the piston rod 158a has an axial outwardly opening blind end bore 159 which may be threaded for reception of threaded means by which the piston rod is adapted to be attached to one of opposed relatively movable members of apparatus with which the damper 150 is adapted to be used.

For high pressure damping purposes, the piston 158 is provided with a piston vane 160 which sealingly engages the inner cylindrical surface A defining a working chamber 168 between the piston and the flange closure member 151.

During inward working strokes of the piston 158, which are effected by relative approaching movement of members to which the opposite ends of the buffer unit are respectively connected or in engagement, damping resistance of hydraulic fluid from the working chamber 168 into the reservoir 158a is afforded by metering displacement flow through a plurality of metering orifices 163 opening through the outer marginal portion of that part of the flange 153a of the closure member 151 which is exposed to the chamber 168. These metering orifices 163 may be calibrated as preferred or desirable for the particular size of unit and damping friction constant preferred and may be in any suitable number, six being indicated although two are shown. These metering orifices 163 communicate with respective blind end bore radial passages 155 opening into an annular peripheral groove 155a registering with an annular chamfer groove 154 afforded by the inside inner end corner of the cylinder 153. Thence a plurality of radial passages 154a in the portion of the head flange engaged by the inner end of the cylinder communicate with the reservoir 150a.

Return movement of the piston 158 may be effected by suitable spring or other biasing means, as is known in this art, or by separating movement of the relatively movable members between which the buffer is mounted and to which the opposite ends of the buffer may be attached. During such return movement, return flow of hydraulic fluid from the reservoir 150a through the orifices 163 affords damping action. However, such damping action is desirably less than or at a lower rate than during inward strokes of the piston, and for this purpose a plurality of larger flow area axially extending orifices 156 communicate with the inner end portions of the radial passages 155 and open from the member 151 into the working chamber 168 in parallel with the orifices 163. During inward working strokes of the piston 158, the orifices 156 are closed by a check valve 157 of ring form. During return stroke movement of the piston, the check valve 157 unseats and is held in suitable spaced relation to the mouth ends of the orifices 156 by means such as a retainer ring 179.

Since the buffer unit 150 is normally fully extended, the construction and relationship of the piston rod 158a and the cylinder extension E are such that in the fully extended positon of the piston rod, the entire uninterrupted surface B of the cylinder extension E, on which sealingly engages a seal 161 carried by the piston rod 158a, is fully protected against dirt and other contaminants. In this instance, the surface B is a cylindrical continuation of the surface A, and this arrangement assures a fully protected, permanently clean cylinder wall throughout the extent between the inner end of the cylinder and the seal 161. Desirably, the seal 161 comprises a ring of rubber or rubber-like material of trapezoidal cross-section having its widest face outwardly in engagement with the surface B, and its inner narrower face opposing a suitably rdeuced diameter portion of the piston rod 158a extending, in the fully projected position of the piston rod, from inside the end portion of the cylinder extension E to a length beyond the end of such extension at least equal to the full length of working stroke of the piston 158. On its axially inner side, the sealing ring 161 is engaged by a complementary rigid packing ring 169 which is maintained under take-up pressure thrust against the sealing ring by means of a circumferential series of coiled compression springs 174 seated in individual blind end bore recesses 175 opening from the shoulder face axially outwardly on the full diameter portion of the piston rod which serves as a bearing in engagement with the cylinder extension surface B.

Means for placing the sealing ring 161 under sealing and wear take-up compression comprise a sleeve 170 rotatably engaged about the reduced diameter portion of the piston rod 158a and desirably longiudtinally adjustably secured thereto through a threaded connection 171, with an annular thread seal 172 desirably provided therein to prevent leakage thereby. A set screw 173 may be provided to lock the sleeve or bushing 170 in adjusted position, with an inner end complementary packing flange 176 thereon affording a static back-up for the sealing ring 161. The flange portion 176 may be in bearing relation to the cylindrical surface B, while the remainder of the length of the outer perimeter of the sleeve member is of small diameter than the cylinder surface.

For additional protection of the cylindrical surface B, a dirt-excluding ring seal 177 such as a felt washer ring, or the like, may be seated in the end of the extension E in engagement with the sleeve 170 and retained by a retainer ring 178 which may also serve as a scraper to dislodge any loose foreign material from the exposed portion of the ring 170 as the piston rod moves inwardly.

While the piston ring 160 serves as a high pressure seal, the sealing ring 161 serves as a low pressure seal and is adapted to prevent leakage outwardly past the piston rod of any hydraulic fluid that may leak past the piston ring during high pressure damping. To avoid accumulation of any fluid that may leak past the piston ring 160, a bleed port 166 extends through the wall of the cylinder 153 rearwardly from the piston ring 160 in the fully retracted position of the piston, and forwardly of the innermost position assumed by the seal 161 at the terminus of a working stroke of the piston. To facilitate bleed-off of the hydraulic fluid from the cylinder surface B into the reservoir, an annular groove 167 is desirably provided in the cylinder surface, and dividing the surfaces A and B and with which groove the bleed-off passage or port 166 communicates. This arrangement also assures that if the piston ring 160 tends to operate with such efficiency as to tend to run the cylinder surface about the piston and the bearing portion of the piston rod substantially dry, hydraulic fluid (e.g., oil) may enter from the reservoir to lubricate the cylinder and bearing surfaces to assure smooth, non-binding action.

It will be understood that modifications and variations may be effected without departing from the scope of the novel concepts of the present invention.

I claim as my invention:

1. A hydraulic buffer adapted to be connected between a pair of relatively movable members,
    comprising a cylinder,
    an end wall on the cylinder,
    a metering tube secured to the end wall and extending concentrically into the cylinder,
    a first piston in said cylinder slidably and snugly engaging the metering tube,
    a piston rod for said piston including a cylinder closed at an end opposite the piston,
    a second piston in said piston rod cylinder,
    means urging said second piston toward said first piston,
    said pistons defining a reservoir therebetween,
    and said metering tube having a plurality of axially non-uniformly spaced orifices whereby fluid is metered from the cylinder to the reservoir in response to closing action of the first piston in the cylinder.

2. A hydraulic buffer adapted to be connected between a pair of relatively movable members,
    comprising a cylinder,
    an end wall on the cylinder,
    a metering tube secured to the end wall and extending concentrically into the cylinder,
    a first piston in said cylinder slidably and snugly engaging the metering tube,
    a piston rod for said piston including a cylinder closed at an end opposite the piston,
    a second piston in said piston rod cylinder,
    means urging said second piston toward said first piston,
    said pistons defining a reservoir therebetween,
    and said metering tube having a plurality of axially non-uniformly spaced orifices whereby fluid is metered from the cylinder to the reservoir in response to closing action of the first piston in the cylinder,
    said second piston having a stabilizer extending axially into said metering tube with an enlarged portion thereof having a diameter approaching the inner diameter of the metering tube and a reduced portion thereof adjacent the second piston,
    said stabilizer having conduit means communicating between opposite sides of the enlarged portion and said metering tube having an axially recessed portion to afford flow past said enlarged portion.

3. A hydraulic buffer adapted to be connected between a pair of relatively movable members, comprising a cylinder,
an end wall on the cylinder,
a metering tube secured to the end wall and extending concentrically into the cylinder,
a first piston in said cylinder slidably and snugly engaging the metering tube,
a piston rod for said piston including a cylinder closed at an end opposite the piston,
a second piston in said piston rod cylinder,
means urging said second piston toward said first piston,
said pistons defining a reservoir therebetween,
and said metering tube having a plurality of axially non-uniformly spaced orifices whereby fluid is metered from the cylinder to the reservoir in response to closing action of the first piston in the cylinder,
said first piston including check valve means affording communication between the reservoir and the cylinder during return action of the first piston and preventing such communication during closing action of the first piston.

4. A hydraulic buffer adapted to be connected between a pair of relatively movable members,
comprising a cylinder,
an end wall on the cylinder, a metering tube secured to the end wall and extending concentrically into the cylinder,
a first piston in said cylinder slidably and snugly engaging the metering tube,
a piston rod for said piston including a cylinder closed at one end opposite the piston,
a second piston in said piston rod cylinder,
means urging said second piston toward said first piston,
said pistons defining a reservoir therebetween,
means for filling said reservoir,
and said metering tube having a plurality of axially non-uniformly spaced orifices whereby fluid is metered from the cylinder to the reservoir in response to closing action of the first piston in the cylinder,
said closed end of said piston rod cylinder having a removable closure,
said removable closure affording insertion of an element into contact with the second piston in the piston rod cylinder for determining the extent of filling in the reservoir.

5. A hydraulic buffer adapted to be connected between a pair of relatively movable members,
comprising a working cylinder,
a cylinder head,
a cylinder extension portion,
a piston in said working cylinder and having a piston rod extending through said extension portion,
said rod having a bearing portion engaging said cylinder extension and a sealing ring engaging said extension cylinder and preventing leakage past the rod from the area back of the piston,
a replenishing reservoir in said piston rod back of the piston and means for filling hydraulic fluid from outside the buffer into said area back of the piston into the reservoir,
and metering means mounted on said cylinder head for metering fluid between the cylinder and said replenishing reservoir through the piston in response to inward or closing movements of the piston in the cylinder.

6. A hydraulic buffer of the character described comprising,
a cylinder,
a working piston in said cylinder,
a piston rod extending from said working cylinder and having a replenishing reservoir chamber therein,
said reservoir chamber having a replenishing piston therein,
spring means normally biasing the replenishing piston toward the working piston, means metering fluid through the working piston from the replenishing chamber,
the total area forwardly of the working piston exposed to pressure of fluid from the replenishing chamber being greater than the area back of the piston exposed to such fluid whereby pressure exerted by the biasing means on said replenishing piston normally causes the working piston to return outwardly after an inward working stroke.

7. A buffer construction of the character described comprising a cylinder having a closure head at one end and open at the opposite end,
a working piston in said cylinder,
a piston rod of smaller diameter than the piston extending rearwardly and substantially beyond the open end of the cylinder,
means within said piston rod normally biasing the piston and rod to a return position,
and a combination cylinder closure and piston rod enclosing cylinder extension sleeve member secured in closing relation to the end of the cylinder and surrounding the piston rod and extending forwardly within the cylinder and providing a rear stop against which the piston engages in its limit of return position within the cylinder.

8. A buffer construction of the character described comprising a cylinder having a closure head at one end and open at the opposite end,
a working piston in said cylinder,
a piston rod of smaller diameter than the piston extending rearwardly and substantially beyond the open end of the cylinder,
a combination cylinder closure and piston rod enclosing cylinder extension sleeve member secured in closing relation to the end of the cylinder and surrounding the piston rod and extending forwardly within the cylinder and providing a rear stop against which the piston engages in its limit of return position within the cylinder,
the piston rod being of complementary diameter to engage slidably within the sleeve member throughout a length from said piston to the outer end of the sleeve member in said return position,
and sealing means carried by the piston rod spaced from the piston substantially as far as the length of said sleeve member and engaging within said sleeve member adjacent to its outer end in said return position.

9. A buffer construction of the character described comprising a cylinder having a closure head at one end and open at the opposite end,
a working piston in said cylinder,
a piston rod of smaller diameter than the piston extending rearwardly and substantially beyond the open end of the cylinder,
a combination cylinder closure and piston rod enclosing cylinder extension sleeve member secured in closing relation to the end of the cylinder and surrounding the piston rod and extending forwardly within the cylinder and providing a rear stop against which the piston engages in its limit of return position within the cylinder,
and a cushion bumper carried by said cylinder closed end and opposing the piston.

10. In a buffer of the character described,
a cylinder having one closed end and an opposite open end,
a working piston reciprocably movable in said cylinder,
a piston rod extending from the piston through the open end of the cylinder,
said piston rod having a replenishing chamber therein,
a cylinder closing ring member closing said open end of the cylinder and extending about said piston rod,
and means comprising passageway through said ring member for filling said replenishing chamber.

11. In a hydraulic buffer of the character described,
a cylinder having an end closure at one end and open at the opposite end,
means on the outer side of said cylinder for attaching the cylinder to apparatus with which the buffer is to be used,
a working piston reciprocably operable in the cylinder,
a piston rod of smaller diameter than the working cylinder concentrically projecting therefrom rearwardly through the open end of the cylinder and having a substantial replenishing chamber therein,
a replenishing piston in said chamber,
means biasing said replenishing piston toward said working piston,
and means closing said open end of the cylinder and the area therein back of the piston and serving as a guide for said piston rod and including means securing the closing means to the open end of the cylinder.

12. In a hydraulic buffer of the character described:
a working cylinder;
a piston reciprocably operable in said cylinder;
a piston rod on said piston projecting from one end of the cylinder;
a cylinder extension on said one end of the cylinder and said piston rod extending beyond said extension throughout the reciprocations of the pistons;
said piston rod having a normal diameter substantially complementary to the inside surface of said cylinder extension and extending from said piston to adjacent the outer end of the extension in the fully extended position of the piston and piston rod;
a ring seal carried by the piston rod and engaging the extension surface and being disposed in the fully extended position of the piston rod adjacent to but inside the extremity of said extension;
and said piston rod being of smaller diameter than said normal diameter in the portion of the piston rod outwardly beyond said extension in said fully extended position of the piston rod, so that upon inward movement of the piston and piston rod, said smaller diameter surface will remain in spaced relation to the surface of the extension.

13. A hydraulic buffer as defined in claim 12, in which said cylinder extension comprises a separate cylindrical elongated sleeve secured to the cylinder and having a portion telescopically concentrically within said one end of the cylinder and between the cylinder and said piston rod.

14. A buffer construction of the character described comprising a cup-shaped elongated one-piece cylinder and solid closure head at one end and the cylinder being open at its opposite end;
a working piston reciprocably operable in said cylinder;
a piston rod of smaller diameter than the piston extending rearwardly and substantially beyond said opposite end;
and a combination cylinder closure and piston rod guiding cylinder extension sleeve member secured in closing relation to said opposite end of the cylinder and extending into the cylinder in concentric relation therewith and providing a rear stop against which the piston engages in its limit of reciprocal movement toward said opposite end of the cylinder.

15. A buffer construction of the character described comprising:
a cylinder having a closure head at one end and open at its opposite end;
a piston reciprocably operable in said cylinder and having a concentric recess opening toward said open end;
a tubular piston rod having one end secured in said recess in the piston and extending outwardly beyond said open end of the cylinder and being closed at its outer end;
a combination cylinder closure and piston rod guide sleeve member secured in closing relation to said open end of the cylinder and providing a stop against which the piston is engageable in its limit of reciprocal movement toward said open end of the cylinder;
and means within the tubular piston rod operative to bias the piston and piston rod normally toward said sleeve member.

16. A buffer construction as defined in claim 15, in which said biasing means comprises a pair of concentric loading springs thrusting at one end against the end closure of the piston rod and at their opposite ends against a piston member mounted in said piston rod.

17. A hydraulic buffer of the character described adapted to be connected between a pair of relatively movable members, and comprising:
a cylinder;
an end wall on the cylinder;
a metering tube concentrically on said end wall and extending into the cylinder;
a first piston in said cylinder slidably engaging the metering tube;
a piston rod for said piston including a cylinder closed at an end opposite the piston;
a second piston in said piston rod cylinder;
means urging said second piston toward said first piston;
said piston defining a replenishing reservoir therebetween;
and a stabilizer rod extending from said second piston into said metering tube and having a head thereon guided within the metering tube.

18. A hydraulic buffer as defined in claim 17, in which said metering tube has a longitudinally spaced series of fluid openings therethrough, and said head has passage means bypassing the fluid therethrough.

19. A hydraulic buffer as defined in claim 17, in which the inner wall of said metering tube has a recessed passage therein bypassing said head.

References Cited by the Examiner

UNITED STATES PATENTS

| | | | |
|---|---|---|---|
| 1,340,233 | 5/1920 | Liebau | 267—64 |
| 2,094,882 | 10/1937 | Garnett et al. | 267—64 XR |
| 2,146,089 | 2/1939 | Onions | 267—64 |
| 2,363,485 | 11/1944 | Down | 267—64 |
| 2,373,505 | 4/1945 | Schnell | 267—64 |
| 2,686,668 | 8/1954 | Bettison | 267—1 |
| 2,737,301 | 3/1956 | Thornhill | 267—64 X |
| 2,778,627 | 1/1957 | Sands | 267—1 |
| 2,914,195 | 11/1959 | Pawling | 267—1 |

FOREIGN PATENTS

| | | |
|---|---|---|
| 436,845 | 10/1935 | Great Britain. |
| 572,175 | 3/1933 | Germany. |

ARTHUR L. LA POINT, *Primary Examiner.*

W. B. WILBER, *Assistant Examiner.*